March 15, 1960　　J. A. POTCHEN ET AL　　2,928,456
BONDED LAMINATED PANEL
Filed March 22, 1955
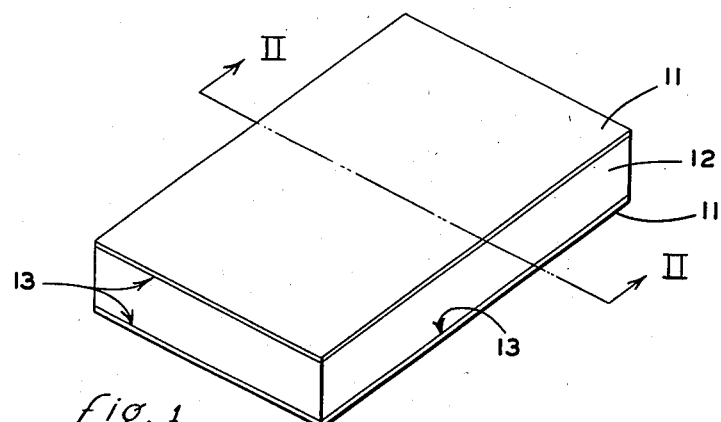
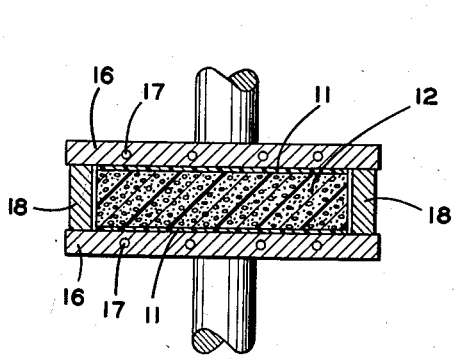
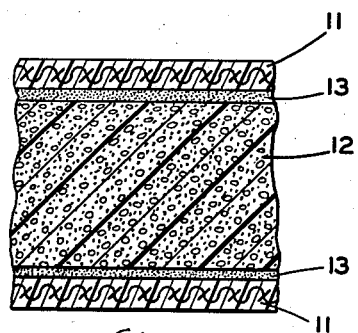
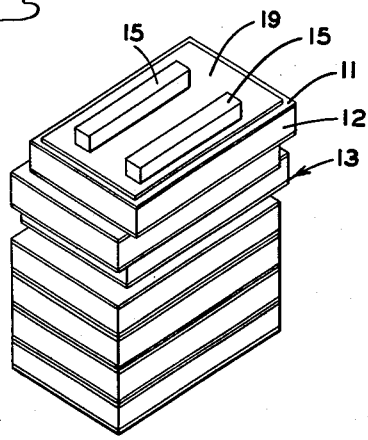
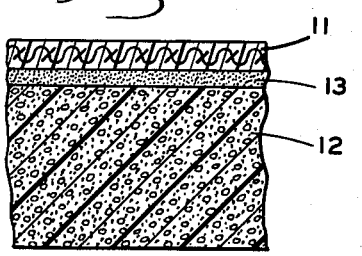
INVENTOR.
JOSEPH A. POTCHEN
GEORGE D. MEIER
GEORGE E. KLOOTE
BY Lindley E. Mills

United States Patent Office 2,928,456
Patented Mar. 15, 1960

2,928,456
BONDED LAMINATED PANEL

Joseph A. Potchen, Marne, and George E. Kloote and George D. Meier, Grand Rapids, Mich., assignors, by mesne assignments, to Haskelite Manufacturing Corporation, a corporation of Delaware Application March 22, 1955, Serial No. 495,914

9 Claims. (Cl. 154—28)

This invention relates to a laminated article, particularly to a panel characterized by its rigidity, light weight, high strength and high thermal insulating value and by its bonded laminar construction. This application is a continuation-in-part of application Serial 479,498, filed January 3, 1955, now abandoned.

The art of making lightweight panels of various types and constructions useful for structural, insulating and decorative purposes has become of great importance. Panels made according to so-called "honeycomb" designs have long been utilized widely for such purposes. More recently, lightweight panels have been devised which contain a core of a foamed resinous substance such as foamed polystyrene. Foamed or cellular polystyrene can be made with an apparent density as low as about 2 pounds per cubic foot without serious decrease in its structural strength, based upon the actual weight of polystyrene per unit volume.

Attempts have been made to produce panels with a polystyrene core and with a resinous or metal outer skin or facing by procedures involving mild heat pressing and the like. Although such panels have utility in certain applications, they are lacking in qualities necessary to make them of value in many applications where their light weight and high insulating properties are desirable. This has been true either because of the difficulty of bonding the foamed polystyrene to the facing material to provide a strong continuous bond or because of the inherent lack of suitable properties and excessive cost of such facing materials as it has been possible to bond to foamed polystyrene with any degree of satisfaction.

As a result of such difficulties, panels of this type prepared as heretofore described can be punctured easily by a blow on the panel face and are insufficiently rigid for many purposes unless the thickness of the facing sheet is increased to such an extent that the panel becomes undesirably heavy and costly. The same is true of the resistance of the panel to flexure under lateral load.

It is apparent that such a panel should, for the widest utility, not only be as light in weight as possible and preserve the high thermal, electrical and sound insulating properties of foamed polystyrene, but that it should also be as rigid and resistant to flexure under lateral load as possible. This indicates the desirability of a facing sheet on the panel having a very high tensile strength compared to its weight, since the greatest stress under lateral load is, of course, longitudinally on the facing opposite the load. At the same time the facing should be sufficiently flexible to avoid its being broken when the panel is deflected at least to a moderate amount under lateral load. The panel facing should also resist puncture and the entire panel should be capable of being made to accurate dimensions and of retaining these dimensions without warping, shrinking or expanding during long periods of storage and use. It should also, of course, maintain its strength and flexibility characteristics for as long a period of time as possible under adverse conditions of exposure to weather, sunlight, moderate heat and rough usage.

Among the products which can be made in thin sheets of some degree of flexibility but of very high tensile strength are those prepared by impregnating strands of oriented glass filaments, or a fabric woven of such strands, with a liquid, partially polymerized resinous composition and subsequently hardening the liquid resin by further polymerization so as to leave the strands embedded in and adhered to the hardened resin. Among the resins which have been used extensively for such purposes are the polyester resins. These are made by reacting a polybasic acid with a polyhydroxy alcohol until a thick, viscous, partially polymerized resinous mass is obtained. This thick, viscous product is mixed with a polymerization catalyst, such as an organic peroxide, and usually with from 5% to 20% of its weight of monostyrene, just prior to the impregnation step and the hardening of the resinous mixture is completed either under pressure at an elevated temperature or, in certain instances, at ambient temperature and atmospheric pressure. A glass reinforced polyester sheet made in this manner is characterized by a considerable degree of flexibility, especially in thin sections, and by a very high tensile strength in the longitudinal direction of the glass fibers. In the case of woven fabric the sheet is of high tensile strength in more than one direction.

The properties of such reinforced polyester sheets would indicate that they should be extremely desirable as facing sheets or lamina for lightweight panels having a foamed polystyrene core. It has, however, not heretofore been possible to fabricate such panels in any suitable fashion for several reasons. The hardening of a polyester resin-impregnated glass fabric in contact with a surface of foamed polystyrene, either at elevated or ambient temperatures, does not lead to satisfactory results because of the solvent action of the monostyrene and other constituents of the polyester mixture on the foamed polystyrene. A certain proportion of the monostyrene is vaporized from the viscous mixture during the hardening of the polyester and this vapor, having no other means for escape, penetrates and softens the foamed polystyrene and may even dissolve it for a considerable distance away from the polyester body. This generally results in a series of voids of considerable area between the hardened facing and the foamed core. As a result, the bond effected is very poor, being highly discontinuous and, also, of low strength wherever any actual bonding does occur. The impossibility of fabricating a panel to accurate dimensions under such conditions is apparent.

The bonding of prefabricated and prehardened reinforced polyester sheets to foamed polystyrene cores has not heretofore proved practical. Any adhesive which depends for its action upon the escape from the bonding region of a volatile liquid, such as an organic solvent for the adhesive, or upon the formation and escape of a gas or water vapor, as in the case of the polymerization in situ of certain resinous adhesives, is unsatisfactory because such vapors have no ready means of escape and it is practically impossible, regardless of the time allowed, to remove them adequately from the bond. The bond, therefore, remains a region of weakness aside from any destructive effect of the volatile material upon the structure of the polystyrene foam. The retention of the least traces of water or water vapor along the region of the bond decreases enormously the otherwise highly desirable electrical resistance of such panels and makes them unsuited for many purposes.

The employment of an adhesive which depends upon the application of more than a moderate degree of heat for setting is not generally practical because of the low rate of heat transmission through the polyester lamina and, also, because of the ease with which the surface of the polystyrene core can be melted and caused to withdraw over a large area from the polyester sheet. It is also generally necessary to roughen the polyester surface to promote good adhesion to it. Most of the adhesives which it has been attempted to use heretofore also lead to warping of the product during hardening or drying even when a long and uneconomical curing period under moderate pressure is employed. The undesirability of tying up equipment in such time-consuming procedures is obvious.

As a result of these and other difficulties, no satisfactory and economical process has heretofore been devised for constructing a lightweight panel having a foamed polystyrene core and a facing of a glass filament-reinforced polyester resin wherein the favorable and desirable characteristics and properties of these two substances are utilized fully. It is apparent that a convenient and economical method for making such lightweght panels, as well as the panels themselves, would be of great value.

According to the present invention, lightweight panels having a foamed core of a polystyrene type resin and a glass filament-reinforced polyester facing bonded firmly to it, with the bond a region of strength and dimensional stability rather than a region of weakness and dimensional instability, can be prepared readily and economically by preforming both the core and the facing sheet, coating the surface of the reinforced polyester sheet to which it is desired to bond the core with a thin layer of a suitable hardenable epoxy resinous composition, and allowing the composition to harden with the coated side of the facing sheet in face to face contact with the surface of the core body. Under such conditions, and using the epoxy resinous composition hereinafter described, the hardening step can be carried out with the laid-up panel under pressure little more than that merely sufficient to insure contact between it and the foamed core. The application of heat is unnecessary to effect the hardening of the epoxy resinous composition, although the hardening is hastened by a moderate degree of heat, and a high degree of adhesion of the epoxy composition to both the reinforced polyester sheet and the foamed polystyrene core is obtained. There is no evolution of gas, water or low-boiling liquid from the epoxy composition during hardening and the hardenable composition has no appreciable solvent action on either the polyester or polystyrene, so that the region of bonding is not weakened. It is not even a region of lowered electrical resistance. The resinous adhesive can, if desired, be applied to the surface of the core rather than to the facing sheet, or even to both, although such procedures usually require the use of more adhesive without a corresponding increase in bond strength. For this reason, it is preferable that the adhesive be applied to the facing sheet, but the invention is not limited thereto.

Of especial interest is the fact that, because of the lack of solvent action of the bonding composition and because there is no evolution or escape of low-boiling constituents therefrom, the bonding operation is characterized by an almost complete lack of deformation or warping of the laid-up structure. Because of this fact, the operation can be carried out rapidly by hand lay-up procedures, if desired, and with the application of little or no pressure to the laid-up structure, to obtain finished panels of a high degree of dimensional accuracy and stability. In practice, a number of such laid-up panels can conveniently be stacked one on top of the other on a flat surface with only a light weight on top of the stack, and the stacked panels left for several hours for the epoxy resinous composition to harden without fear of there being any warping or distortion of even the topmost panel.

Generally speaking, however, the panel is well adapted to continuous manufacture and to the use of moderately elevated temperatures and pressures to hasten the curing of the epoxy resinous adhesive and to insure even more accurate dimensioning of the finished panel. According to such procedures, the laid-up panel is often heated in a press until the epoxy resinous adhesive has hardened to such an extent that the panel is dimensionally stable and the panel then removed from the press and the curing allowed to proceed to completion under ambient temperature and pressure. A typical operation of this type involves pressing the laid-up panel between platens heated at from about 120° to about 155° F. for from fifteen to twenty minutes in a press fitted with stops or cauls which will permit compression of the panel to a slight degree but to a degree insufficient to crush or injure the structure of the foamed polystyrene core. Such compression may decrease the over-all thickness of the panel by a few percent. The panel should, of course, not be heated to the softening point of the polystyrene type resin from which the core is made.

It is characteristic of the operation that, once the epoxy resinous adhesive has hardened with the panel under such mild compressive conditions, the panel retains the thickness to which it was compressed when the pressure is relieved and it is thus possible, using this or equivalent procedure, to prepare panels dimensionally accurate to within a few thousandths of an inch. The use of such moderate pressure also assists in promoting the eveness of the bond between the facing sheet and the core and overcomes the difficulty often encountered in preparing the core with a surface such that all of the severed walls of polystyrene between the voids terminate in essentially the same plane. It should be emphasized, however, that the invention in its broadest aspect is not limited to the employment of even such moderate temperatures and pressures as those referred to.

Because of the high degree of continuity and high strength of the bond, the great tensile strength and light weight of the glass-reinforced polyester facing and the inherent resistance of the foamed polystyrene core to crushing under confinement, the new panel made as just described is exceptionally light in weight per unit volume and is, at the same time, rigid and highly resistant to deflection under lateral load, but sufficiently flexible to deflect to a remarkable degree without damage under lateral overload. The panel is impervious to moisture and air and is highly resistant to injury by exposure to adverse weather conditions. Because of its high heat insulating value and the inertness and non-absorptiveness of the polyester facing, the panel is ideally suited for lining refrigerated truck bodies and food storage rooms. The facing does not absorb odors and can be scrubbed and disinfected when soiled.

The facing is highly resistant to puncturing by blows with blunt instruments. When accidentally punctured, it can be repaired easily to restore its original strength and imperviousness by cementing a suitable section of facing sheet over the injured area using the epoxy resinous adhesive composition. Abutting panels can be joined securely and tightly together by thin battens of the facing sheet adherred over the joint. The panel is rotproof and verminproof. It can be cut and fabricated without the use of special tools. By employing suitable polystyrene type foamed resinous cores and suitable polyester resins in making the facing sheets, panels can be made which are non-inflammable to a practical degree.

Reference is made to the accompanying drawing wherein in the interest of clarity certain features are shown on a somewhat exaggerated scale and wherein:

Figure 1 is an oblique view of a panel embodying features of the invention,

Figure 2 is a partial section, greatly enlarged and distorted, taken along the line II—II of Figure 1, Figure 3 is a partial section corresponding to Figure 2 but showing another modification of the invention, Figure 4 represents a number of newly assembled panels stacked one on top of the other during hardening of the epoxy resin adhesive according to one modification of the process of the invention, and Figure 5 is a schematic elevation, partially in section, illustrating one method of employing moderate heat and pressure in forming the panel of the invention.

Referring to Figure 1, the modification of the invention shown comprises a pair of facing sheets 11 and a lightweight core 12 bonded together along the region 13 with a hardened epoxy resin adhesive. As illustrated on a more exaggerated scale in Figure 2, the bonding layer 13 of hardened epoxy resin adhesive is interposed between the facing sheet 11 and the lightweight core 12, forming a uniform thin film bonding the facing sheet and the core securely together. In practice, the bonding film 13 is generally only just thick enough, usually of the order of a few thousandths of an inch, to form a continuous film to insure a continuous bond between the facing sheet and the core.

The modification illustrated in Figure 3 is similar to that of Figure 2 except that the core 12 is faced on only one side with a facing sheet 11 bonded to it with a bonding layer of hardened epoxy resin adhesive 13. The modification of Figure 3 is often of value where the panel can be installed with its unfaced side in contact with a rigid surface so that the panel is supported against flexing under lateral load, as in the lining of the walls, floors and ceilings of refrigerated vaults to provide insulation.

As indicated previously, the panel of the invention is constructed from preformed facing sheets and a preformed core. The facing sheet is coated, e.g. by spraying, troweling, squeegeeing or with rollers, on one side with an epoxy resin adhesive, hardenable at ambient and moderately elevated temperature, and the coated surface pressed into light but firm contact with one side of the core. A facing sheet, similarly coated, is placed in contact with the opposite side of the core when it is desired to face both sides of the core. The assembly can then be left undisturbed, preferably on a flat surface, for a length of time, e.g. for from one to several hours, sufficient for the epoxy resin to harden. In hand operation it is advantageous to assemble a number of panels at one time and to then stack the assembled panels one on top of another, as illustrated in Figure 4, while the epoxy resin hardens. It is usually advisable to place a sheet 19 of flat, rigid material such as a sheet of rigid plywood or a hardboard panel on top of the uppermost facing sheet and to weight it moderately, as with weights 15, to insure adequate uniformity of contact of the facing sheets and cores during hardening of the epoxy resin.

To hasten the hardening operation and to provide for even closer tolerances in the thickness of the panel, a heated press can be used if desired. As illustrated in Figure 5, the laid-up assembly consisting of the foamed polystyrene type resin core 12 and the facing sheets 11 with an intermediate film, not shown in Figure 5, of a hardenable epoxy resinous composition intermediate the core and the facing sheet is placed between platens 16 of a single opening or multiple opening press, the platens being provided with heating means, e.g. with electrical resistance elements or with passageways 17 within the body of the platen through which a heating medium can be circulated. Suitable stops or cauls 18 can, if desired, also be placed between the platens to limit the degree of compression of the panel and the press then closed and heated. As indicated previously, pressing for about twenty minutes with the platens at a temperature of about 150° F. is generally enough to harden the epoxy resinous composition sufficiently so that the panel remains dimensionally stable to within a few thousandths of an inch when the press is opened and the panel removed. Further curing or hardening of the epoxy resinous composition may occur during several hours after the panel is removed from the press. It is apparent that the curing cycle in the press will depend to a considerable extent on the actual epoxy resinous composition employed, the thickness of the facing sheet and on other considerations. When a panel is desired with only one facing sheet, it is generally convenient to place two panels back to back in a single opening of the press, the faced surface of each thus being heated.

The degree of compression of the laid-up panel in the press can be varied to a considerable degree but should in no case be sufficient to actually crush or injure the foam structure of the lightweight core. Generally speaking, the degree of compression will amount to less than about 6 percent, and may often be as low as 1 or 2 percent, of the total thickness of the unpressed panel. Presses having multiple heated separators to accommodate a number of panels at one time can be used, if desired.

Following such procedures, panels can be made which show not the slightest sign of warping during hardening of the epoxy resin or after long periods of storage or use. Examination of the bond shows a continuous strong adhesion of the film to both the facing sheet and the core. The bond is much stronger than the body of the core and thus becomes a region of strength rather than a region of weakness. Inasmuch as the facing sheets and the core can be performed to within close limits of thickness, the finished panel has a highly accurate predetermined thickness even when a press is not employed, the contribution of the epoxy resin to the thickness being almost negligible. The sides and ends of the panel are usually trimmed, e.g. by sawing or grinding, to smooth them and to bring them to accurate dimensions. However, if sufficient care is taken in dimensioning the facing sheets and core and in the initial lay up of the panel, such subsequent trimming and smoothing is unnecessary.

The facing sheets are, as mentioned previously, formed of a polymerized polyester resinous sheet reinforced with a fabric woven of strands of glass monofilaments. Such sheets can be formed according to known procedures. The formation of the facing sheets is sometimes accomplished by drawing a sheet of the fabric continuously through an impregnating bath of the partially polymerized resin containing a catalyst and copolymerizable agent, such as styrene, thence through a heated zone to polymerize and harden the polyester composition. The sheet is then cut into suitable lengths or, if not too thick, it can be rolled up on a fairly large radius. Sheets prepared in this manner have the advantage that the glass strands are maintained under stress in the direction of travel of the fabric and remain so in the finished sheet. The thickness of the sheet can be controlled to close tolerances by drawing it, prior to hardening the resin, between accurately spaced opposed rolls or doctor blades to remove excess resin. Generally speaking, facing sheets prepared by this and similar procedures contain from 35 to 60 percent by weight, usually from about 40 to about 50 percent, of glass, the balance being resin.

The glass fabric employed in making the facing sheet can be of any suitable sort, including those generally referred to as "woven fabric" and "woven roving." The characteristics of such fabrics are well known in the art and need not be elaborated upon here. Fabrics are available such that a facing sheet prepared using a single ply of the fabric can have a thickness of from about 0.015 to about 0.035 inch. Thicker, and stronger, facing sheets can be prepared by using a plurality of plies of woven glass fabrics. Although the invention is concerned principally with the use of facing sheets reinforced with woven glass fabrics, it is sometimes suitable, especially when the panel or article is not likely to be subjected to excessive lateral load, to employ mats of unoriented glass fibers or combinations of unoriented fibers and woven fabrics as reinforcing agents.

The polyester resinous composition used in making the glass reinforced facing sheet can be any of the numerous commercially available polyester resins recommended for this purpose. As available and as generally employed, they are thick viscous liquids capable of further polymerization and copolymerization under suitable conditions. They are made by esterifying an olefinically unsaturated dicarboxylic acid, such as maleic acid, itaconic acid and citraconic acid, as well as mixtures thereof with one another or with a considerable proportion of a functionally saturated dicarboxylic acid, such as phthalic acid, tetrachlorophthalic acid, adipic acid and the like, with a polyhydric alcohol. Of special interest are the polyesters containing a considerable proportion of a halophthalic acid because of their substantially non-inflammable nature.

Polyhydric alcohols generally employed include ethylene glycol, propylene glycol, butylene glycol, polyethylene glycol, polypropylene glycol, monoesters and monoethers of glycerol and the like. Esterification is carried on until a predominantly linear polymer of suitable viscosity and average molecular weight is obtained.

The predominately linear polyester thus obtained contains polymerizably reactive ethylenic unsaturation which, by copolymerization with a polymerizable olefinically reactive monomer, leads to the formation of cross-linked thermoset resins without the use of any appreciable pressure and at a conveniently low temperature. Suitable olefinically reactive monomers include styrene, the halostyrenes, the methylstyrenes, isopropenyl toluene, vinyl naphthalene, acrylonitrile, methyl acrylate, and others. The cross-linking polymerization is usually carried out with the aid of a peroxide type catalyst.

In preparing the facing sheet, the glass fabric is first impregnated thoroughly with a mixture of the polyester, peroxide catalyst and olefinically reactive monomer, e.g. 10 to 15 percent of monostyrene, being sure that each fiber is wetted thoroughly. The impregnated fabric is then heated to the requisite temperature, e.g. to 200° to 240° F. for a short time. The resulting panel facing sheet is characterized by a high degree of impermeability to moisture and vapor, by its high resistance to many and varied types of chemical reagents and by its high electrical insulating properties. The impregnating composition also frequently is made up containing conventional modifying agents, such as triethyl phosphate and other flexibilizers, plasticizers and viscosity reducing agents. Suitable pigments or soluble dyes can be included in the polyester composition prior to hardening, if desired.

The foamed core of a polystyrene type resin is formed by physical means, e.g. by cutting a suitably dimensioned block or slab from a mass of the foamed composition. Cores of the desired size can be formed directly in this way or they can be built up from smaller pieces, if more convenient. When built up from such smaller pieces, the pieces can be joined along their edges to form the larger cores utilizing the epoxy resinous adhesive applied to the adjoining edges. The preparation of foamed masses of polystyrene type resins is well known in the art, as well as the methods employed in cutting, trimming and shaping them to produce blocks, slabs and other desired shapes. Such foamed compositions are composed of a multitude of small, roughly spherical voids each completely surrounded by a substantially impervious membrane of the resinous composition. Foams may be made having a density as low as about two pounds per cubic foot without serious loss of strength on the basis of the actual amount of resin per unit volume. Even such lightweight foams are not easily crushed, especially when pressure is applied by a rigid surface parallel to the plane of the surface of the foam. Such polystyrene type foams are rotproof, verminproof, non-absorbent and have high heat, sound and electrical insulating values. They are non-warping and non-shrinking at ordinary and moderately elevated temperatures.

Polystyrene type resins which can be employed for making the foamed cores for the panels of the invention are those made by polymerizing a hydrocarbon or halohydrocarbon having a vinyl radical on an aromatic nucleus and include the products resulting from the polymerization of styrene, monomethylstyrene, dimethylstyrene, vinyl napthalene and the halogenated styrenes. Foams made from polyhalostyrene are of particular value in the present instance because of their substantial fireproofness and self-extinguishing characteristics. The foamed core used in the panel preferably has a density of from about 2 to about 10 pounds per cubic foot, depending upon the particular properties of the panel desired, although cores having a density higher than this can be employed, if desired.

The epoxy resinous composition referred to herein as the adhesive agent used for bonding the facing sheet to the lightweight core is the liquid, partially polymerized high molecular weight reaction product of a diphenol and an epoxy compound. One example of such a hardenable reaction product is that obtained by heating together 2,2'-bis(4-hydroxyphenyl)-propane and epichlorhydrin in the presence of an alkali, e.g. sodium hydroxide, whereby there are formed polymeric glycidyl polyethers of the phenolic substance having properties and an average molecular weight dependent upon the reaction conditions and the proportions of reactants employed. However, suitable reaction products can be prepared using a wide variety of other dihydric phenols and epoxy compounds. Such other dihydric phenols which can be employed include resorcinol, 1,1-bis(4-hydroxyphenyl)-2-ethylhexane, 1,1-bis-(4-hydroxyphenyl)-2-methylpropane, 2,2-bis(4-hydroxyphenyl)-butane, 1,1-bis(4-hydroxyphenyl)-propane, 2,2-bis(4-hydroxy-2-tertiarybutylphenthalene and the like.

Other epoxy compounds suitable for reacting with the diphenols include such relatively simple compounds as glycerol alpha, alpha'-dichlorohydrin and other aliphatic halomonoepoxy compounds, as well as more complex polyepoxy compounds, such as 1,2-epoxy-3,4-epoxybutane, bis-(2,3-epoxypropyl)-ether, bis-(2,3-epoxypropyl)-thioether and 1,2-bis-(2,3-epoxypropyloxy)ethane. The polyepoxides obtained by epoxidizing with per acids, such as performic and peracetic acids, the triglycerides containing unsaturated acyl radicals of long chain fatty acids can often be utilized to advantage. Triglycerides which can be epoxidized in this way to form polyepoxides include cottonseed oil, peanut oil, olive oil, perilla oil, linseed oil, soybean oil and other naturally occurring or synthetic unsaturated triglycerides. Such polyepoxides frequently contain from about 2.5 to about 5.0 epoxy groups per molecule and are usually relatively mobile liquids. Mixtures of diphenols and mixtures of epoxy compounds can be used, if desired.

It is a characteristic of the formation of glycidyl polyethers by such reactions that the reaction can be controlled, e.g. by regulating the reaction conditions and the nature and proportions of reactants, so that products can be obtained varying from somewhat viscous liquids through highly viscous liquids to high-melting solids. Furthermore, the products formed, whether liquid or solid, can be hardened or cured by further polymerization. During the curing process, additional proportions of a diphenol or of an epoxy compound, either of which may be the same as or different from those used originally, can be added, together with a suitable catalyst or hardening agent, and caused to enter into the polymerized reaction product thus obtained, the properties of which may fall within a wide range of desired characteristics.

Suitable epoxy resinous bonding agents for use in the present invention are those comprising liquid reaction products of diphenols and epoxy compounds of the type just described and which are capable of further polymerization to solid products under the influence of a proper hardening agent either with or without the addition of a further proportion of a diphenol or an epoxy compound, or both. Certain of such suitable bonding agents capable of further polymerization comprise mixtures of suitable viscosity of liquid and solid glycidyl polyethers, and a long chain expoxidized triglyceride, although substantially any liquid, further polymerizable glycidyl polyether or mixture thereof can be used, if desired. The glycidyl polyether composition is mixed just prior to use with an amine hardening agent. Suitable amines include di-ethyl amine, triethyl amine, ethylene diamine, diethylene triamine, pyridine, piperidine, dicyandiamide, fatty acid salts of amines and others well known in the art. An amine hardening agent is employed to avoid the separation of solids, water or gases during the hardening step, the hardening in such cases being capable of being effected under substantially anhydrous conditions and without appreciable change in dimensions of the composition which would lead to swelling or shrinking.

Although the invention has been described with particular reference to flat panels and their preparation, it should be pointed out that the process is equally applicable to the making of curved shapes of various sorts and even to shapes and panels of non-uniform thickness. As an example, an elongated article can be prepared which is curved transversely with the curvature of the facing sheets being circular or parabolic, as desired. When making such articles, it is usually preferable to cut the lightweight core to approximately its final desired shape. When the facing sheets are heavy and relatively non-flexible it is also preferable to form these to approximately the desired contour prior to coating them with adhesive and assembling the structure. Such operations are generally carried out to advantage in a press because of the difficulty of maintaining adequate and even contact of the several curved surfaces with one another by simple hand lay-up procedures. When the facing sheets are thin and relatively flexible, it is frequently possible to use flat sheets and to effect the desired curvature of the sheets in the press. Such latter procedure, however, may not always lead to a high degree of dimensional stability due to the inherent strained condition of the facing sheets which is not entirely relieved during the curing of the epoxy resinous adhesive even at moderately elevated temperatures. The invention is not limited as to the ultimate shape of the panel or article so long as it includes the inventive features herein pointed out.

The following examples illustrate, but do not limit the invention.

EXAMPLE 1

A sheet of woven roving glass fabric about four feet wide was drawn continuously through an impregnating bath comprising 100 parts by weight of a polyester resin made from a mixture containing a high proportion of a polychlorinated endomethylenetetrahydrophthalic acid or anhydride (available from Hooker Electrochemical Company under the trade designation Hetron-92), 5 parts of styrene monomer, 5 parts of triethyl phosphate and 1 part of a benzoyl peroxide catalyst. The wet impregnated fabric was drawn between opposed accurately spaced gauging rolls to remove excess resin and to insure complete penetration of the resin between the filaments. A thin sheet of cellophane was fed over one of the gauging rolls into contact with one side of the impregnated sheet and a sheet of a moderately heavy glassine type paper was fed over the other roll into contact with the other side of the fabric.

The gauged impregnated fabric, faced on one side with cellophane and on the other side with paper, was then carried on the smooth surface of a slowly revolving, driven metal drum, traveling at the same peripheral speed as the fabric, and at a temperature of about 225° F. to effect a partial polymerization of the resinous composition. The still flexible structure, still faced with cellophane and paper, was then drawn from the drum surface, after a partial revolution of the latter, over a roller having a radius of several inches and thence under longitudinal tension and unsupported between closely spaced heated plates to complete the polymerization. The cured sheet then passed between friction rolls which, together with the driven drum and conveying rolls, effected the forward travel of the sheet through the entire process. The cured sheet then passed beneath a transverse shear and was cut automatically into desired lengths, usually into 8 foot lengths.

The impregnated sheet was sufficiently flexible to be rolled up on an approximately 12 inch, or smaller, radius without injury. The cellophane and paper could be stripped easily from its surfaces. It was smooth surfaced on both sides, the surface cured in contact with the cellophane having a high gloss finish and the surface cured in contact with the paper having a smooth mat surface well adapted for bonding with an adhesive. The facing sheet thus prepared using a single ply of glass fabric contained about 45 percent by weight of glass, and had a uniform thickness of 0.030 to 0.032 inch and a very high tensile strength. It was fire resistant and self-extinguishing when ignited with a torch and the torch removed.

Another facing sheet prepared in entirely analogous fashion, but using two sheets of the glass fabric and adjusting the clearance of the gauging rolls accordingly, had a uniform thickness of approximately 0.060 inch and contained about 45 percent by weight of glass. It could not be bent on as small a radius as the thinner sheet. Similar facing sheets were prepared using other types of glass fabrics and other polyester resinous compositions, the sheets in all cases being dimensionally accurate and having properties entirely similar to those of the facing sheet just described, except that those made from non-halogen-containing resins were more combustible.

Slabs of a foamed polystyrene type resin of various uniform thicknesses, each about one foot wide and 4 feet long, were cut from a mass of the foamed resin. The particular resin employed contained a relatively high proportion of polymerized polychlorostyrene and was sufficiently fire resistant to be self-extinguishing when ignited. The slabs were dimensionally stable and were not easily crushed. Slabs were prepared weighing from about 2 to about 4.5 pounds per cubic foot, and higher.

A cold-curing epoxy resin adhesive composition was prepared by mixing four parts by weight of a commercially available high molecular weight reaction product of a diphenol and an epoxy compound, which was in the form of a viscous liquid and which was capable of further polymerization to form a solid polymer, with about one part of a commercially available amine catalyst mixture. The epoxy resin used was obtained from Shell Development Company of Emeryville, California, under the trade designation of Shell 828 and the amine catalyst was obtained from Bakelite Corporation under the trade designation of ERL 2793. The amine catalyst appeared to be a mixture of an amine and a polyester type liquid resin. The adhesive composition thus prepared was a liquid which gelled and hardened gradually upon standing for several hours. Eight of the slabs of foam were assembled and joined to form a slab 4 feet by 8 feet by coating their abutting edges with the epoxy resin adhesive composition and pressing the edges firmly together while the resin hardened.

One of the facing sheets 0.030 inch thick containing halogen compounds, prepared as described above, was readied for use in making a panel of the invention by stripping the cellophane and paper from its surfaces. The mat surface of the sheet from which the paper was stripped was coated with a thin uniform layer of the epoxy resin adhesive composition using just enough of the composition to insure a continuous coating on the sheet. A 4 foot by 8 foot slab of the polystyrene type foamed resin, cut and assembled as described above with a uniform thickness of 2.94 inches from a hologen-containing mass of foam, was then placed flat on the coated facing sheet. A similar facing sheet coated in the same manner with the epoxy resin adhesive was then placed with the coated face down on top of the slab of foamed resin.

A number of other panels were assembled in identical fashion and the group of assembled panels was then stacked one on top of another on a flat surface. A flat wood caul about 3.5 inches thick and approximately 4 feet wide and 8 feet long was laid on top of the uppermost panel. About 250 pounds of timbers were piled on top of the caul and the stack left undisturbed over night for the epoxy resin to harden. The stack was then disassembled and each panel was trimmed accurately so as to be precisely 8 feet long and 4 feet wide. Each panel had a uniform thickness of 3 inches with a variation of not more than a few thousandths of an inch. The panels were rigid, strong, highly impervious to moisture and each had a high insulating value with respect to sound, heat and electricity. Destruction and examination of one of the panels chosen at random revealed that the bond between the facing sheet and the foamed core was entirely continuous except for the fact that the resin had not penetrated appreciably into the pockets of the surface of the foamed core formed by cutting through voids in the foam. The entire panel weighed 0.93 pound per square foot.

A number of other panels were prepared in entirely analogous fashion using polystyrene foam prepared from unchlorinated styrene monomer. Other panels were prepared using both chlorine-containing and chlorine-free polystyrene resin type foam cores of different thicknesses and densities in combination with facing sheets from about 0.02 inch to about 0.06 inch thick. Panels were thus prepared having total thicknesses to within close tolerances of 1, 1½, 1⅝, 2, 3, 4, 5 and 6 inches. The panels constructed with both the facing sheets and the foamed core made from compositions high in chlorine were substantially fireproof and failed to continue burning in the air after ignition with a torch.

Similar panels were prepared in a similar manner except that the lightweight core was bonded on only one side to a facing sheet.

A panel prepared as just described with a facing sheet on each side and having a thickness of 3 inches was placed flat on a level rigid surface. A short length of a one-inch diameter steel rod was cut with perfectly flat ends normal to the longitudinal axis of the rod. The rod was stood on its end on the upper surface of the panel at a point removed several inches from the edge of the panel. A load was applied gradually to the upper end of the rod until the panel failed by reason of rupture of its upper facing sheet. When the upper facing sheet had a thickness of 0.03 inch, failure occurred under a load of 543 pounds. When the facing sheet had a thickness of 0.06 inch, failure occurred under a load of 800 pounds.

Impact tests were carried out on representative panels each 1⅝ inch thick by dropping 1¾ inch and 3 inch diameter steel spheres from different heights on the panel supported horizontally on a flat cement slab. The effect of the impact was measured by the maximum indentation produced in the upper surface of the panel. The results are given in the accompanying Table I.

*Table I.—Indentation under impact*

| Impact in ft. lbs. | 1¾″ Dia. Sphere | | 3″ Dia. Sphere | |
|---|---|---|---|---|
| | Indentation in inches | | | |
| | .030″ faces | .060″ faces | .030″ faces | .060″ faces |
| 14 | .10 | .06 | | |
| 23 | | | .11 | .08 |
| 29 | .13 | .03 | | |
| 47 | | | .13 | .09 |
| 93 | | | *.29 | .20 |

No crazing or fracture occurred on any of the above tests except the starred (*) item which had slight crazing but no fracture.

EXAMPLE 2

A core 8 feet long, 4 feet wide and 2 inches thick was cut from a mass of a halogen-containing polystyrene type foam having a density of about 2 pounds per cubic foot. Two facing sheets prepared as in Example 1, each about 0.032 inch thick and containing about 45 percent of glass, were coated on their mat faces with an epoxy resin adhesive in a manner similar to that described in Example 1. The coated faces of the facing sheets were placed in contact with opposite sides of the core. The assembled panel was then placed on the lower platen of a press equipped for heating. Stops, each precisely 2 inches thick, were then placed on the lower platen along the sides and ends of the panel and the press closed until both platens were in firm contact with the stops. The press was then heated at approximately 150° F. for about twenty minutes, opened and the panel removed. The panel was allowed to lie on a flat surface undisturbed for several hours and was then found to have a uniform thickness of 2 inches within a tolerance of less than .0005 inch.

A test specimen 5 inches wide and 24 inches long was cut from the panel. This specimen was supported on parallel edges 20 inches apart and a concentrated load was applied in increasing amounts at the center of the span until failure of the specimen occurred. The specimen failed by buckling of the compression face. The load at failure was noted and designated as the "maximum load," L.

The deflections of the specimen at the center of the span for corresponding loads were recorded and a "load-deflection" graph was constructed by plotting the loads in pounds, P, against the deflections, $d$, in inches. The graph was a straight line indicating that the deflection was a linear function of the load, the slope of the graph, $$\frac{d(P)}{d(d)}$$

having a constant value for deflections short of failure of the specimen and being a measure of the relationship of the increment of deflection, $d(d)$, caused by an increment of load, $d(P)$.

Using the values thus obtained on the 5-inch specimen, the stiffness factor per one-inch width of panel was caulculated according to the formula $$EI = \frac{d(P)l^3}{5 \times 48 d(d)} = \frac{l^3}{5 \times 48} \cdot \frac{d(P)}{d(d)}$$

in which $$\frac{d(P)}{d(d)}$$

is the slope of the "load-deflection" graph just referred to, $l$ is the span in inches between the supports and $EI$ is the stiffness factor of the panel in square inch-pounds per inch width of the specimen.

The maximum bending moment was calculated according to the formula $$M = \frac{Ll}{5 \times 4}$$

in which M is the maximum bending moment in inch-pounds and L and l have the values given.

The tests and calculations were carried out on each of three test specimens 5 inches wide cut from the same panel. These specimens were designated as A, B and C, respectively.

Another panel 2 inches thick was prepared in identical manner utilizing a core 2 inches thick cut from the same polystyrene type resin foam as utilized in preparing the panel from which specimens A, B and C were cut, but utilizing facing sheets each 0.018 inch thick and containing about 45 percent of glass. Three specimens each 5 inches wide and 24 inches long were cut from this panel and the same tests and calculations carried out as before. These specimens were designated as D, E and F, respectively.

In the following Table II there are given for each of the six test specimens the maximum load in pounds, L, at failure of the specimen, the slope $$\frac{d(P)}{d(d)}$$

of the load-deflection graph and the calculated values for the maximum bending moment, M, in inch-pounds per one inch wide strip and the stiffness factor, EI, in square inch-pounds per one inch wide strip for each specimen.

TABLE II.—BENDING DATA

| Specimen No. | A | B | C | D | E | F |
|---|---|---|---|---|---|---|
| Maximum Load (L) | 366 | 404 | 322 | 300 | 251 | 269 |
| Slope of "Load-Deflection" Graph $\frac{d(P)}{d(d)}$ | 1,185 | 1,185 | 1,185 | 1,000 | 1,000 | 1,000 |
| Span Length (l) | 20 | 20 | 20 | 20 | 20 | 20 |
| Maximum Bending Moment (M) | 366 | 404 | 322 | 300 | 251 | 269 |
| Stiffness Factor (EI) | 39,500 | 39,500 | 39,500 | 33,300 | 33,300 | 33,300 |

We claim:

1. A structural panel of predetermined dimensions which includes: a preformed core comprising a rigid foamed resin selected from the group consisting of the polymerization products of styrene, methyl styrenes and halostyrenes and mixtures thereof, the core having substantially planar parallel opposite sides; a flexible preformed facing sheet on each of the parallel opposite sides of the core comprising a fabric woven of strands of glass filaments, each embedded in and surrounded by the reaction product of a mixture comprising a substantially linear olefinically unsaturated polyester, an olefinic monomer polymerizably reactive with the polyester to form a thermoset resin and a peroxide catalyst for the polymerization, the strands being disposed within the sheet of thermoset resin with at least those extending in one direction under tension and the facing sheet comprising between about 35 percent and about 65 percent by weight of glass; and a bonding agent bonding a surface of the facing sheet to a surface of the core to provide a rigid bond stronger than the body of the core, the bonding agent comprising the polymerization reaction product of a mixture comprising a diphenol, a polymeric glycidyl polyether of a diphenol and an amine catalyst for the polymerization, the panel being characterized by its high degree of rigidity and strength per unit weight, by its high degree of flexibility without failure under lateral overload and by its freedom from warping and distortion from its predetermined dimensions during long storage and use.

2. The method for forming a flat structural panel which includes: providing a lightweight core of suitable uniform thickness of a foamed polystyrene type resin having a density of from about 2 to about 10 pounds per cubic foot and having opposite parallel substantially planar surfaces; providing a flexible panel facing sheet of substantially uniform thickness of a heat-hardened reaction product of a thermosetting resinous composition comprising a peroxide catalyst, an olefinically reactive monomer and a major proportion of an olefinically unsaturated substantially linear polyester of an unsaturated dicarboxylic acid and a glycol, the facing sheet being reinforced with from about 35 to about 65 percent of its weight of a fabric woven of strands of glass monofilaments disposed within the sheet of thermoset resin with at least the strands and monofilaments extending in one direction being under longitudinal tension; providing a liquid epoxy resinous bonding composition comprising a diphenol, a polymeric glycidyl polyether of a diphenol and an amine catalyst, the composition being polymerizable at a polymerization temperature below the softening temperature of the polystyrene type resin to form a hardened resinous composition of substantially the identical weight, shape and dimensions of the unhardened composition; coating one side of the panel facing sheet with a continuous film of the bonding composition; pressing the coated surface of the panel facing sheet into firm contact with a surface of the lightweight core; and causing the assembled core, facing sheet and bonding composition to remain at the polymerization temperature for from one to several hours to cause the bonding composition to harden and to bond the facing sheet and the core to one another securely over substantially the entire area of contact of the facing sheet and core.

3. The method of claim 2 wherein the hardening step is carried out under controlled compressive conditions to produce a panel having a thickness not more than about 6 percent less than that of the laid-up unpressed panel, the compressive conditions being maintained at least until the epoxy resin has hardened sufficiently to prevent appreciable increase in thickness of the panel due to swelling upon release of the pressure.

4. The method of claim 2 wherein the assembled core, facing sheet and bonding composition is caused to remain at a temperature of from about 120° to about 155° F.

5. A structural panel of predetermined dimensions which includes a pre-formed core comprising a rigid foamed resin selected from the group consisting of the polymerization products of styrene, methyl styrenes, halo styrenes and mixtures thereof, the core having substantially planar parallel opposite sides, a flexible pre-formed facing sheet on at least one of the said sides of the core comprising strands of glass filaments oriented substantially parallel to the sides of said facing sheet and each strand being embodied in and surrounded by the product of polymerization of a mixture comprising a substantially linear olefinically unsaturated polyester and an olefinic monomer polymerizably reactive with the said polyester, the strands being disposed within the sheet of thermoset resin with at least those extending in one direction under tension and the facing sheet comprising between about 35% and about 65% by weight of glass, and a bonding agent bonding a surface of the facing sheet to a surface of the said core to provide a rigid bond stronger than the body of the said core, the bonding agent comprising a polymerization reaction product of a liquid epoxy resinous bonding composition essentially free of volatile components, the panel being characterized by its high degree of rigidity and strength per unit weight, by its high degree of flexibility without failure under lateral load and by its freedom from warping and distortion from its predetermined dimensions during long storage and use.

6. A structural panel in accordance with claim 5 wherein the said glass strands comprise between about 40% and about 50% by weight of said facing sheet.

7. A structural panel in accordance with claim 5 wherein said strands of glass filaments are in the form of a woven fabric.

8. An article of manufacture in accordance with claim 5 in which the said formed resin is the polymerization product of halo styrenes and is characterized by its substantial inability to support combustion.

9. An article of manufacture in accordance with claim 8 wherein the thermoset resin of said facing sheet is characterized by its substantial inability to support combustion.

References Cited in the file of this patent

UNITED STATES PATENTS

| | | |
|---|---|---|
| 2,376,653 | Boyer | May 22, 1945 |
| 2,512,996 | Bixler | June 27, 1950 |
| 2,576,073 | Kropa et al. | Nov. 20, 1951 |
| 2,642,920 | Simon | June 23, 1953 |
| 2,693,922 | Ellison et al. | Nov. 9, 1954 |
| 2,764,516 | Pace | Sept. 25, 1956 |

OTHER REFERENCES

"Ethoxylines," Preiswerk, Modern Plastics, pp. 85–88 (November 1950).

UNITED STATES PATENT OFFICE
CERTIFICATE OF CORRECTION

March 15, 1960

Patent No. 2,928,456

Joseph A. Potchen et al.

It is hereby certified that error appears in the printed specification of the above numbered patent requiring correction and that the said Letters Patent should read as corrected below.

Column 1, line 56, for "flexture" read -- flexure --; column 6, line 38, for "performed" read -- preformed --; column 8, line 45, for "thalene and the like" read -- yl)-propane,4,4'-dihydroxydiphenyl,1,5-dihydroxynapthalene and the like --; column 15, line 11, for "formed" read -- foamed --.

Signed and sealed this 8th day of November 1960.

(SEAL)

Attest:

KARL H. AXLINE
Attesting Officer

ROBERT C. WATSON
Commissioner of Patents